US005963413A

United States Patent [19]

Zahlmann et al.

[11] Patent Number: 5,963,413

[45] Date of Patent: Oct. 5, 1999

[54] SPARK GAP

[75] Inventors: Peter Zahlmann, Neumarket; Raimund König, Sengenthal; Georg Wittmann, Lauterhofen; Martin Stuiber, Neumarkt; Willibald Duschek, Pilsach, all of Germany

[73] Assignee: Dehn + Söhne GmbH & Co. KG, Nürnberg, Germany

[21] Appl. No.: 09/072,679

[22] Filed: Apr. 27, 1998

[30] Foreign Application Priority Data

Apr. 26, 1997 [DE] Germany ........................ 197 17 802

[51] Int. Cl.[6] .................................................... H02H 1/00

[52] U.S. Cl. ........................................ 361/118; 361/123

[58] Field of Search ........................ 361/117–120, 123, 361/126–132

[56] References Cited

U.S. PATENT DOCUMENTS

| | | | |
|---|---|---|---|
| 3,141,108 | 7/1964 | Benner et al. . | |
| 3,780,350 | 12/1973 | Sanger et al. | 361/118 |
| 4,433,354 | 2/1984 | Lange et al. | 361/120 |

FOREIGN PATENT DOCUMENTS

| | | |
|---|---|---|
| 0024583 | 3/1981 | European Pat. Off. . |
| 0808004 | 11/1997 | European Pat. Off. . |
| 732002 | 1/1943 | Germany . |
| 732002 | 2/1943 | Germany . |
| 2934236 | 3/1981 | Germany . |
| 2934236 | 2/1983 | Germany . |
| 8502723 | 6/1985 | WIPO . |

*Primary Examiner*—Michael J. Sherry
*Attorney, Agent, or Firm*—Friedrich Kueffner

[57] ABSTRACT

A spark gap for use in the power supply of medium voltage and low voltage networks, wherein two rotationally symmetric electrodes are arranged in a housing and an arc space is provided between the two electrodes for the arc which is formed in the event of a spark-over and its follow-on current. The two electrodes are arranged in the direction of the longitudinal center axis of the spark gap one behind the other and at a distance from each other. A disk of an electrically insulating material is positioned perpendicularly of the longitudinal center axis so as to electrically separate the two electrodes from each other. The insulating disk has an opening adapted to the hollow cylindrical inner space forming the spark-over place for the arc. The arc space includes a rotationally symmetric arc chamber arranged concentrically with the longitudinal center axis for the follow-on current. The arc chamber is positioned between the two electrodes. The electrically active length of the arc chamber can be selected differently while the outside dimensions of the spark gap are maintained.

26 Claims, 6 Drawing Sheets

SPARK GAP

BACKGROUND OF THE INVENTION

1. Field of the Invention

The invention relates to a spark gap for use in the power supply of medium voltage and low voltage networks, with two rotationally symmetric electrodes which are arranged inside a housing and with an arc space provided between the two electrodes for the arc that is formed in the case of a spark-over and its follow-on current.

2. Description of the Related Art

Such a spark gap is known from DE-PS 29 34 236. In all the embodiments of this publication the arc space in question is positioned as a spark-over place at the edges or sides of the electrodes. A disadvantage of all these embodiments is that the electrical data of the spark gap are fixed. This applies, in particular, to the extinguishing capacity of the follow-up current. Another disadvantage of spark gaps of the abovementioned type, but also of other spark gaps, is that due to greatly different installation sites and also the possibly different connection conditions existing there, in present day practice there are a great many different types of connection and installation means of spark gaps. In the aforementioned publication DE 29 34 236 C2 nothing is mentioned about the mounting or installation of the spark gap. No particulars are furnshed either about the adaptation of such a spark gap to different electrical conditions.

The DE-PS 732 002 shows an overvoltage arrester for use in high-voltage systems. Inside a long, housing-like, cylindrical tube made of insulating material a pin-shaped electrode is provided rotationally symmetrical to same, followed by a tube made of a material which, when heated, gives off gas and finally, at the end of the outer housing tube, a roughly cup-shaped counter-electrode with a blow-out opening. Because of the relatively large distance between the pin-shaped electrode and the cup-shaped counter-electrode, such an overvoltage arrester is suitable only for use in high-voltage systems, but not for use in medium-voltage or low-voltage systems. Also with this overvoltage arrester no particulars are furnished for the adaptation to different electrical conditions.

SUMMARY OF THE INVENTION

The object or problem to be solved by the invention consists, therefore, in the first instance in the creating of a spark gap, which when used in medium-voltage or low-voltage networks will be suitable for the different electrical conditions that occur in practice.

To achieve this object first of all, a spark gap embodiment is provided in accordance with the invention wherein the two electrodes are arranged in the direction of the longitudinal centre axis of the spark gap behind one another and at a distance from one another, wherein in the aforementioned space a disk of an electrically insulating material is positioned extending perpendicular to the aforementioned longitudinal centre axis, which disk electrically separates the two electrodes from one another, the insulating disk being provided with an opening adapted to the hollow cylindrical inside space and there forming the spark-over place for the arc, wherein the arc space is constructed as a rotationally symmetric arc chamber concentric to the longitudinal centre axis for the follow-up current, which is positioned between the two electrodes, and wherein, whilst maintaining the outside dimensions of the spark gap, the electrically active length of this arc chamber can be selected differently. The follow-up current, therefore, flows inside the arc chamber roughly along the longitudinal centre axis of the spark gap. With this, at otherwise identical dimensions of the spark gap, the follow-up current extinguishing capacity of this spark gap can be changed and accordingly adapted to the requirements in question. The selection or change of the active electric length of the arc chamber takes place already during manufacture, i.e. ex factory, in accordance with the requirements expected in practice. This has the great advantage that at otherwise identical components, and in particular also identical outside dimensions and also identical external connection parts, the extinguishing capacity of the follow-up current of such a spark gap can be changed. In contrast to the publication DE 29 34 236, the arc and its extinguishing are positioned inwards in a chamber which is rotationally symmetric to the essential components of the spark gap, such as the electrodes, and concentric to the longitudinal centre axis of the spark gap. This permits several advantageous and structurally easy to realise possibilities for changing the electrically active length of this chamber. This will be dealt with further on.

Compared to the subject of DE 732 002, where the response voltage is determined by the relatively large distance between the two electrodes, with the invention the response voltage is relatively small, as essentially it depends only on the thickness of the insulating disk.

Furthermore, measures may be provided that permit a selecting of the field strength at the spark-over place. Here, in addition to the ability to select the extinguishing capacity of the follow-up current, an ability to select the response voltage of this spark gap is obtained. Also this takes place, whilst retaining the outside dimensions of the spark gap and its external connection means, during the manufacture ex factory. The advantages of the two setting or selecting abilities are, therefore, combined. As already mentioned, the aforementioned changes or selection possibilities are made possible ex factory by replacing or modifying only a few parts with relatively low manufacturing costs. In this connection reference is made to the information furnished further on, including the associated sub-claims. The teachings of the invention, therefore, furthermore have the advantage that as a result thereof also changes in the surge current carrying capacity can be obtained. A change in the diameter of the arc chamber may also already take place during manufacture, i.e. ex factory. This, in relation to the inside diameter of the blast nozzle, which must also be changed ex factory, brings about a considerable change in the follow-up current behavior and the surge current behaviour. Also in this connection it is important that—within the framework of a certain size range—the outer contours of the spark gap and the means for installing the spark gap at the site need not be changed as a result of structural modifications for the aforementioned changes. Accordingly, only one standard type or only a few standard types of such spark gaps need be created, each of which can be installed under different installation conditions. Because of the possible adaptation to different electrical conditions, such a spark gap can to a large extent be used universally.

To change the electrically active length of the arc chamber, the invention provides several design possibilities.

The invention also includes several design possibilities for changing the field strength at the spark-over place and accordingly the response voltage.

Further advantages and characteristics of the invention can be noted from the other sub-claims, as well as from the following description and associated drawing of possible embodiments according to the invention, wherein:

DESCRIPTION OF THE PREFERRED EMBODIMENTS

Figure 1:
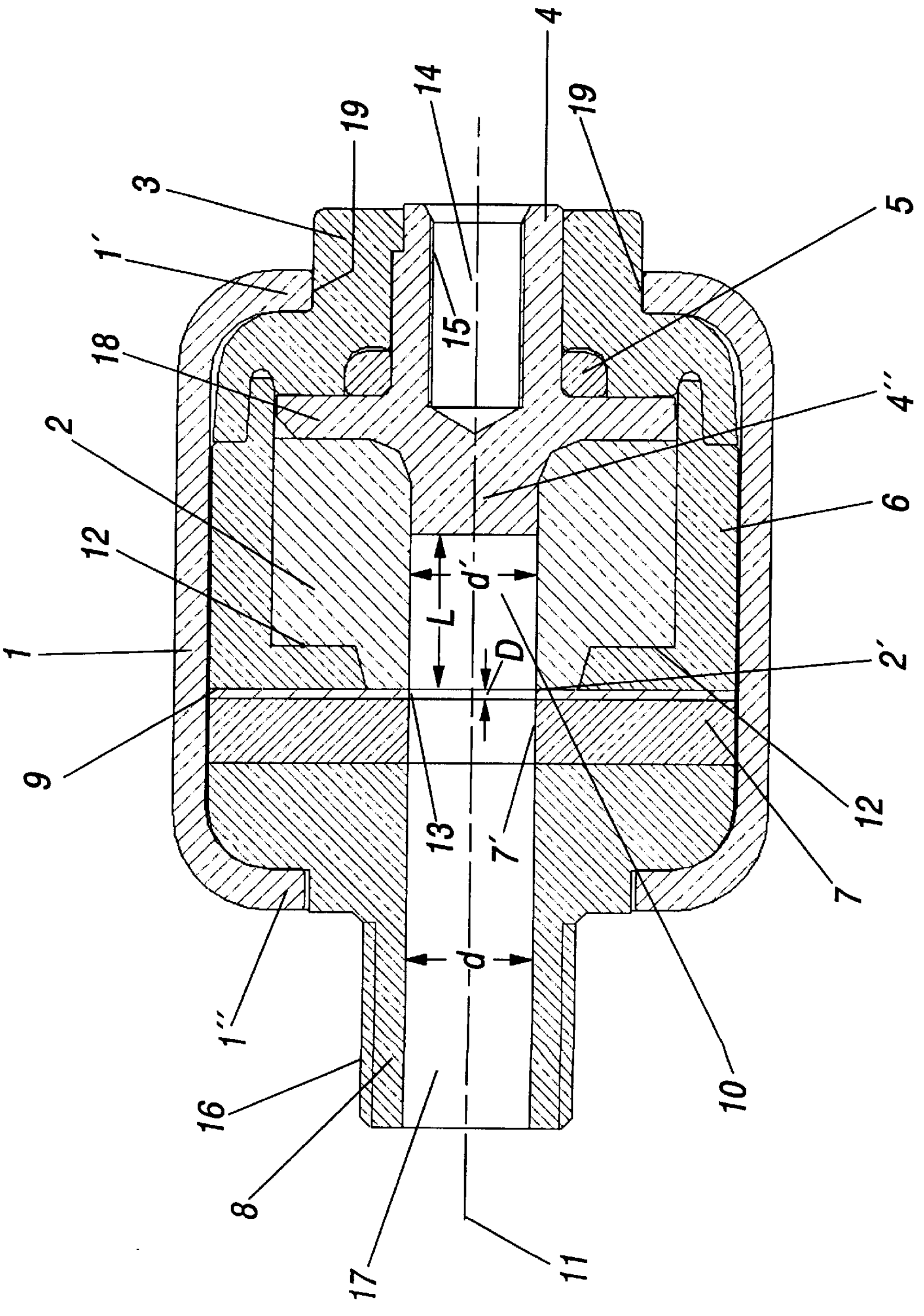
FIG. 1: shows a first exemplified embodiment of the invention in longitudinal section.

The exemplified embodiment according to FIG. 1 shows in longitudinal section a spark gap with an electrode 4 and a counter-electrode consisting of the two parts 7, 8. In terms of the object and its solution, this is a preferred embodiment of the invention.

Figure 1A:
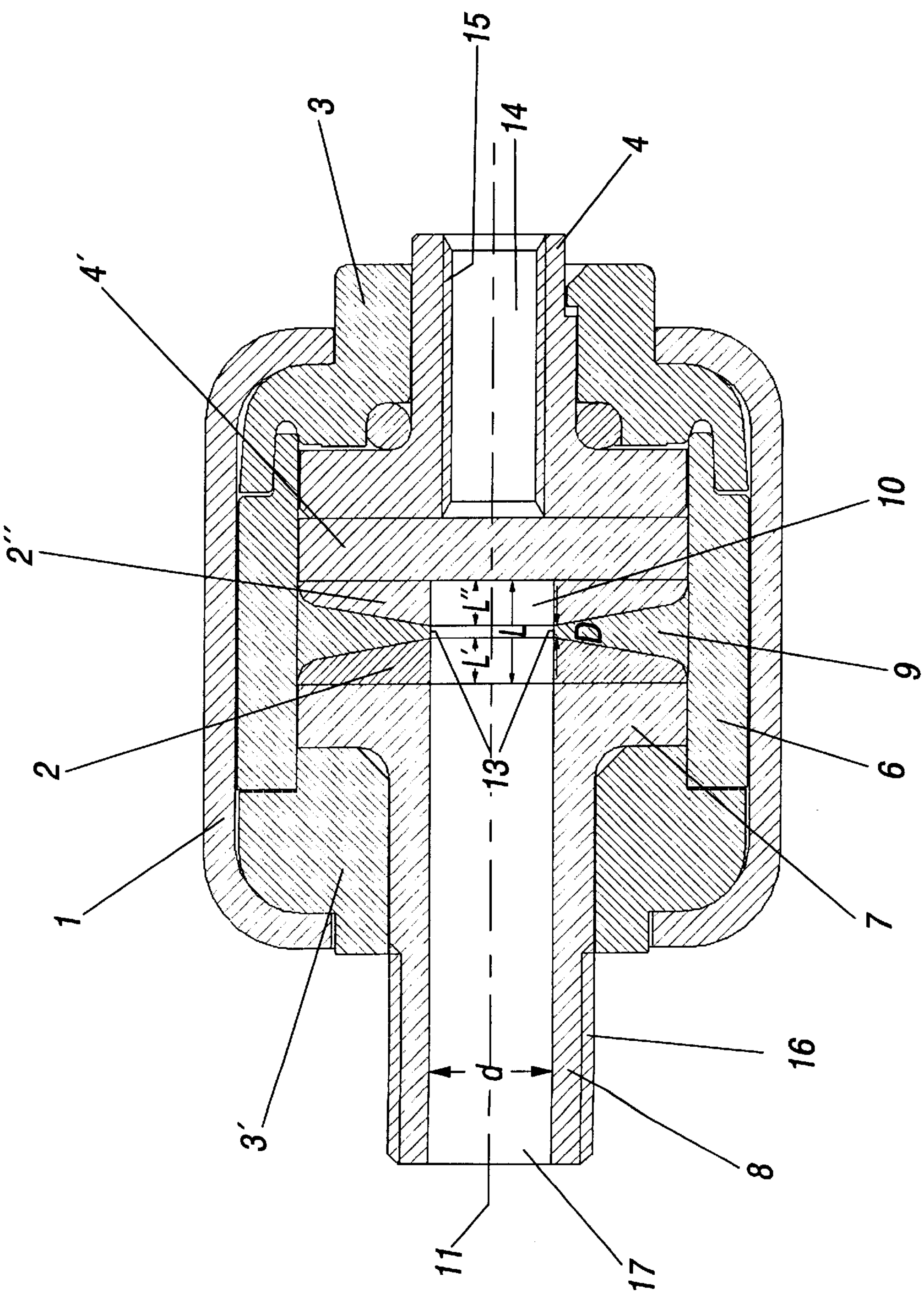
FIG. 1*a*: shows a second exemplified embodiment of the invention in longitudinal section.

With the exemplified embodiment according to FIG. 1 as well as with another exemplified embodiment according to FIG. 1*a* to be explained further on, all components of the spark gap in question are made rotationally symmetric and have the same longitudinal centre axis 11.

The aforementioned rotational symmetry also applies, in particular, to the electrodes. With the exemplified embodiment of FIG. 1, between the electrodes 4 and 7, 8, the cylindrical arc chamber 10 with a length L is provided concentric to the longitudinal centre axis 11. The arc chamber 10 is surrounded by an also rotational-shaped spacer in the form of an arc chamber element 2 made preferably of an electrically conductive plastic. With a preferred embodiment of the invention this spacer may consist of an insulating material which, when heated, gives off an extinguishing gas. Such an insulating material surrounding the arc chamber will under the effect of the temperature give off $H_2$, which flows radially inwards from all sides, compresses the arc column (radial blowing) and stabilises the arc in the longitudinal centre axis 11. This is an important advantage of the rotationally symmetric construction and arrangement of the components of such a spark gap as explained in the foregoing. As no direct contact takes place between the arc column and the material of the spacer 2, compared to the state of the art (see DE 29 34 236) a considerably longer service life is obtained at an at the same time smaller size of the overall arrangement. This spacer 2 is in turn surrounded by another spacer 6 made of an insulating plastic. If the spacer 2 consists of an electrically conductive plastic, by varying the length of this spacer 2, the electrically active length L of the arc chamber and, accordingly, the follow-up current extinguishing capacity of the spark gap arrangement can be decisively determined. Also by the combination of an electrically conductive plastic for the spacer element 2 with an insulating plastic for the insulating disk 9 explained in the following, a lengthening of the electrically active length off the arc chamber is possible, without changing the response voltage of the overall arrangement, for in this case the response voltage is dependent only on the thickness D of the insulating disk 9. With this a lower response voltage at an at the same time sufficiently great length of the arc chamber can be obtained. A third variant for selecting another electrically active length of the arc chamber consists in a lengthening or shortening of the in FIG. 1 left part 4' of the electrode 4 positioned on the right. As a result thereof the in FIG. 1 left face of the electrode 4 is moved either further towards the insulating disk 9 (shortening of the electrically active length L) or the distance between this face and the insulating disk 9 is increased (increasing the electrically active length L of the chamber 10).

The insulating material disk 9 is provided between the spacers 2, 6 and part 7 of the electrode 7, 8. The insulating material disk accordingly separates the spacers 2, 6 electrically as well as mechanically from part 7 of the electrode 7, 8.

In addition to the aforementioned possibility of selecting or changing the electrically active length L of the arc chamber 10, in order to change the response voltage the thickness D of the insulating disk 9 and/or for the possibility of selecting the electric field strength and accordingly the spark-over conditions, the separating line 12 between the two spacers 2, 6 can be constructed accordingly. In this connection FIG. 1 shows a stepped pattern of this separating line, which for the rest also extends rotationally symmetric. In the present exemplified embodiment the step is chosen in such a way that the section 2' of the spacer 2 lies directly against the insulating disk 9. If this spacer 2, which surrounds the arc chamber in its rotationally symmetric shape, is made of a conductive material, the voltage of the electrode 4 is passed via the spacer 2 and its section 2' positioned next to the arc chamber directly to the insulating material disk 9. Seeing that section 2' of the spacer 2 with its inside surface surrounds the arc chamber and accordingly is separated from the corresponding inside surface 7' of the electrode part 7 only by the thickness D of the insulating material disk 9, the maximum of the field strength occurs there at the insulating material disk 9. Any spark-over between the two spacers 2, 6 is avoided. On the contrary, a sliding spark-over takes place from the inside surface 7' of the electrode part 7 along the inside surface 13 of the insulating material disk 9 to the inside surface of section 2' of the spacer 2. As already mentioned, a prerequisite for this is that the relevant dielectric constants of the plastics of the two spacers 2, 6 are adapted to one another in such a way that the maximum of the field strength occurs at the air boundary layer along the aforementioned inside surface 13. The response voltage is, therefore, determined by the thickness D and the arc length and accordingly the extinguishing behavior by the length L+D.

In the following the dimensions of a possible embodiment of a spark gap according to the invention are indicated only by way of example. The overall length (measured in the direction of the longitudinal centre axis 11) may amount here to 50–60 mm. The length L of the extinguishing chamber is approx. 5 mm and the thickness D of the insulating disk 0,5 mm. From this it follows that the length of the arc chamber formed by insulating material is small compared to the length of the overall arrangement. As the size D is considerably smaller than the length L (in the present example D is only 1/10 of L), the invention provides the further advantageous possibility of being able to vary the response voltage without changing the overall length L+D in such a way that the extinguishing properties are noticeably influenced by a lengthening or shortening of L. Retaining the size of D ensures that the response voltage does not change.

Naturally, in another variant of the invention both the response voltage and the extinguishing property can each be set at a specific value ex factory by a corresponding dimensioning.

Summarising it can be said that by a corresponding changing of the aforementioned parts at the factory, the follow-up current extinguishing capacity as well as the value of the field strength and accordingly the spark-over voltage can be varied, without having to change the outside dimensions and the connection possibilities of such a spark gap. For, the outside dimensions result essentially from the outside housing 1 made of an insulating plastic or metal, which on the outside covers the components provided on the inside, possibly electrically insulates and at the same time mechanically holds them together. The outside housing 1 is not, however, affected by the aforementioned changes.

Figure 3:
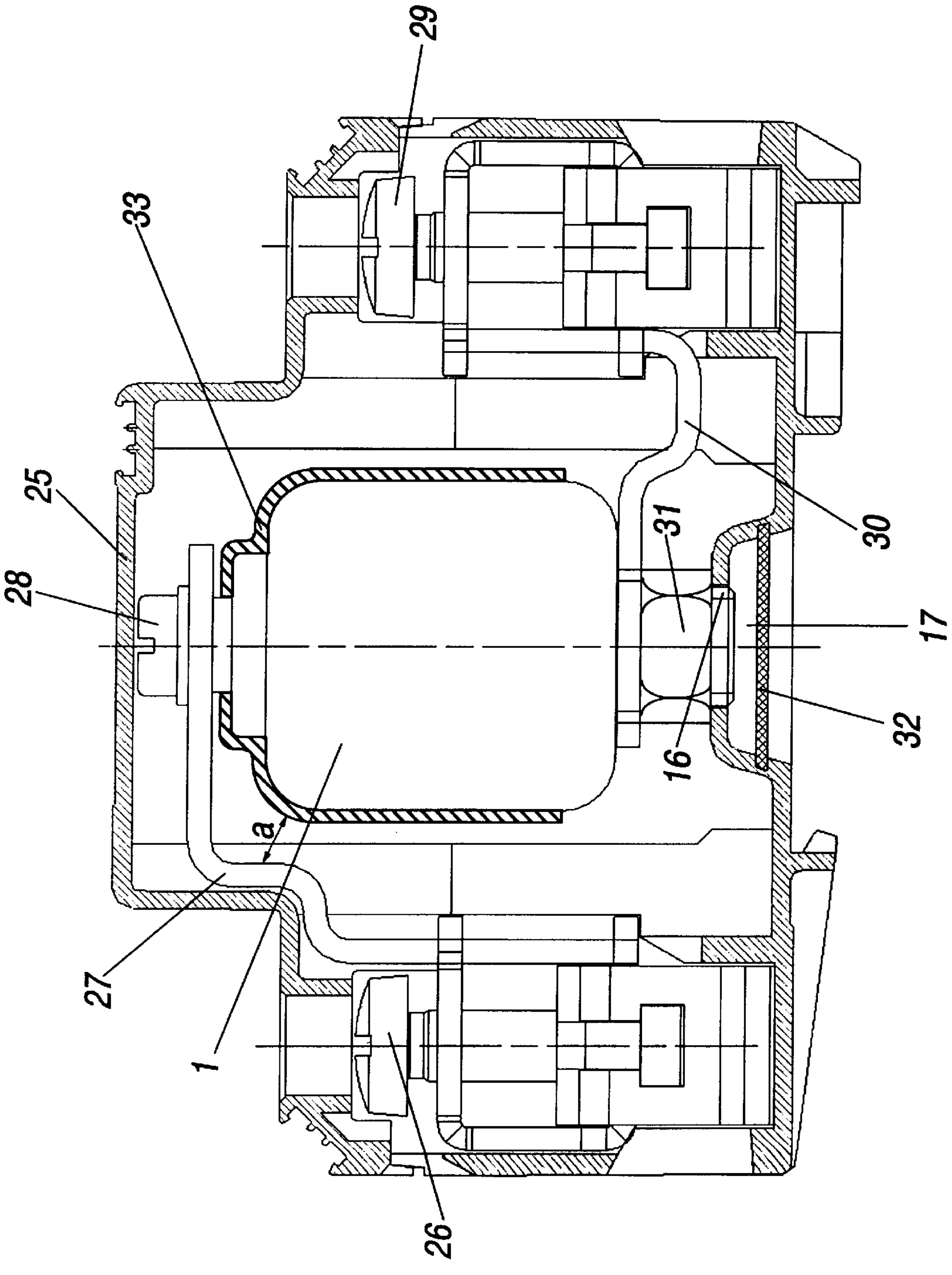
FIG. 3: shows the use of a spark gap according to the invention inside an external equipment housing.
Figure 4:
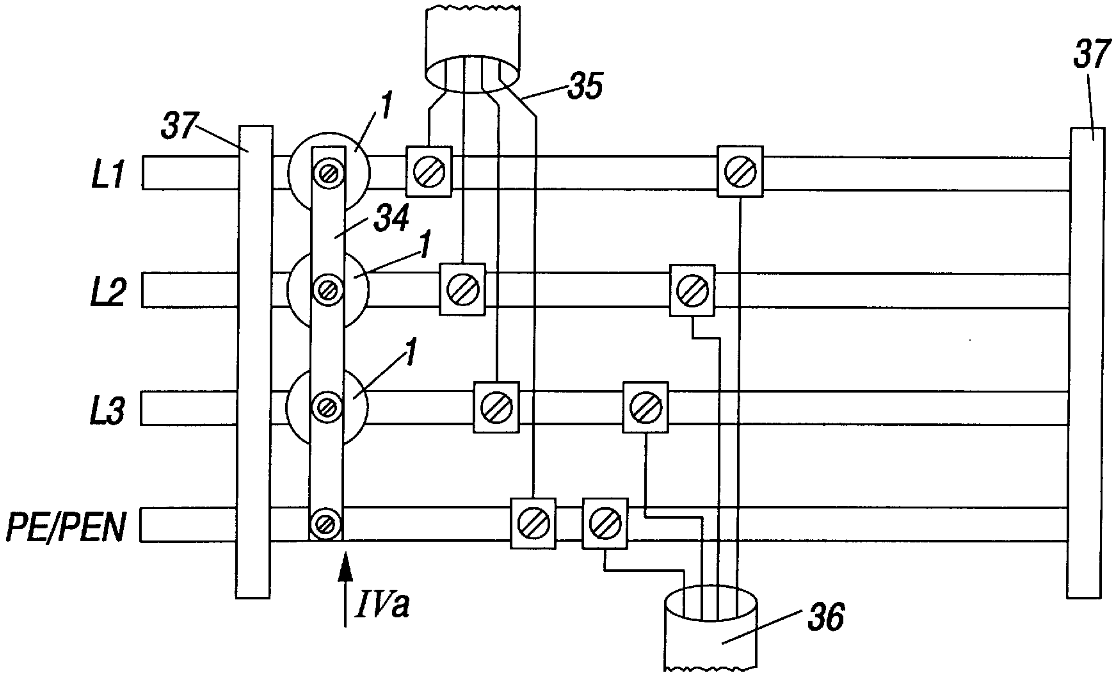
FIG. 4: shows an application and installation possibility of spark gaps according to the invention in a diagrammatic top view.
Figure 5:
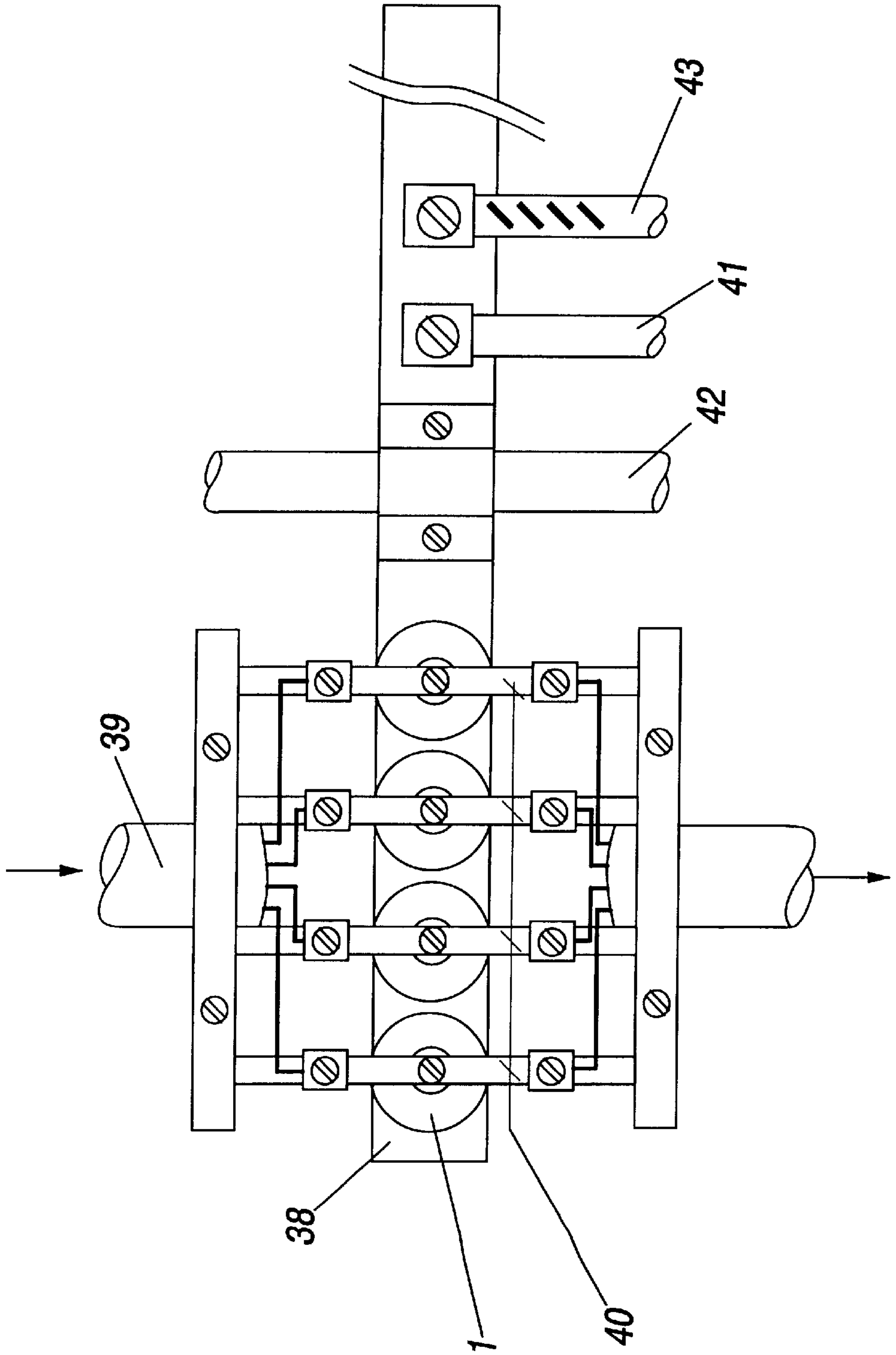
FIG. 5: shows a further application possibility of a spark gap according to the invention, also in a diagrammatic top view.

To create connection possibilities that can be used as universally as possible, the electrode 4 may have a blind hole 14 with an internal thread 15, whereas the part 8 of the electrode 7, 8 extends out of the housing of the spark gap in the form of a connection piece and on its outer periphery is provided with an external thread 16. The threads 15, 16 permit, for example, the screwing on or screwing in of this spark gap module as a separate individual device or as a built-in component in busbars, in housings or on other electrical components. For details in this connection reference is made to the explanation of FIG. 3, 4 and 5 given in the following.

Furthermore, it is a special feature of the present exemplified embodiment that the electrode 7, 8 has a cylindrical inside space 17, concentric to the longitudinal centre axis 11, which changes over into the arc chamber 10 and is open to the outside (in FIG. 1 to the left). With this the gases heated by the arc can be discharged (blown out) via the inside space 17. As a result of the nozzle-shaped electrode part 7, 8, aided by the rotationally symmetric arrangement to the longitudinal centre axis 11, a directed gas flow takes place. The hot gases are blown off to the outside through the flow-line optimised nozzle. The deflections of the outgoing gas flow customary with the state of the art are avoided. Such a deflection would, as a matter of fact, have the disadvantage that it adversely affects the extinguishing capacity.

With regard to further details of the construction of such a blow-out electrode, it is recommended to provide the first electrode part 7 as a burn-off resistant insert, preferably of tungsten-copper, whereas the second electrode part and at the same time also the nozzle element 8 can be made of a less expensive material, e.g. brass. At the outlet of the inside space 17 and accordingly at the outlet end of the electrode part 8, so-called exhaust elements may be provided (not illustrated in the drawing), which reduce the temperature of the blown-out, hot and highly ionised gases to such an extent that in the surroundings of the spark gap arrangement no special safety measures need be provided. A further advantage of an adaptation ex factory to electrical requirements is that by choosing the diameter d of the inside space 17 and the diameter d' of the arc chamber 10, the surge current carrying capacity and the follow-up current extinguishing capacity of this spark gap can be changed. Here in particular a choice of the ratio of the diameter d of the inside space 17 to the diameter d' of the arc chamber 10 is possible. The ratio d/d' may be 1:1 (see drawing) to maximum 2:1. A reduction of the diameter d' of the chamber 10 improves the follow-up current behavior whereas an increase in this diameter adversely affects the follow-up current behavior. An increase in the diameter d of the inside space 17 improves the surge current behavior, whereas a reduction of the diameter d adversely affects the surge current behavior. Depending on the requirements, either the diameters d and d' can be changed independently or both diameters d and d' can be changed simultaneously. This results in corresponding design possibilities. By increasing the diameter d, the surge current carrying capacity is increased correspondingly, seeing that the pressure generation in the arc chamber 10 drops. Because this nozzle electrode is electrically conductive, a directed base shift takes place from the inside to the outside and, accordingly, a lengthening of the arc.

To seal off this spark gap in the area of the electrode 4, a ring-shaped cover element 3 with an O-ring 5 is provided. The cover element 3 holds the outer spacer 6 and pushes it against the insulating disk 9. The electrode 4 is provided with an all-round flange 18 which transmits the pressing force of the cover element 3 to the spacer 2. The aforementioned pressure on the cover element 3 is brought about by the bent-over part 1' of the in this case metallic outer casing 1. This bending over takes place after the components of the spark gap have first been placed in the metal casing 1, resting against the bent-over part 1" shown on the left in FIG. 1. To be able to transmit the aforementioned pressing force to the spacer 2 in an optimum manner or so that the outer casing 1 can absorb the pressure forces produced in the arc chamber, it is recommended to choose the diameter of the flange 18 of the electrode 4 larger than the diameter of the circle described by the face 19 of the bent-over part 1'.

Making the outer casing of metal has the advantage that it can withstand high mechanical stresses and, therefore, is very resistant. Furthermore, by the abovementioned bending over according to reference numeral 1', the necessary pressing force can be exerted on the indicated inside components.

If required, the casing may also be a hermetically sealed casing.

Whereas with the exemplified embodiment of FIG. 1 the arc chamber 10 is positioned in an area to one side of the insulating disk 9, the active length of the arc chamber may also be provided on both sides of the insulating disk 9. Such an also preferred embodiment of the invention is illustrated in FIG. 1*a*. It comprises an arc chamber which is split into two, the total length L of which is made up of the two partial lengths L' and L". Compared to the embodiment of FIG. 1, the construction of the two electrodes as well as that of the spacers 2, 6 has changed. The electrode shown on the right in the drawing consists of a part 4, which is also provided with the bore 14 with internal thread 15. The part 4 is made of a conductive material such as brass. It is in contact with the other electrode part 4', which is made of a high quality and burn-off resistant material such as tungsten-copper. This is followed, in the direction to the in FIG. 1*a* left end, by the aforementioned arc chamber with the length L. The periphery of this arc chamber L is surrounded by two spacers 2, 2", and an insulating disk 9 positioned between them. This is followed, seen to the left, by the other electrode 8, which adjoining the arc chamber L' ends in a flange 17 which forms an integral part of the electrode 7 and is made completely of a high quality and burn-off resistant material such as tungsten-copper. On its connection piece projecting to the outside it is also provided with an external thread 16. Accordingly, a cover element can be provided on both sides of the spark gap, i.e. not only on the right as per reference numeral 3, but also on the left in the drawing FIG. 1*a* as indicated by reference numeral 3'. Accordingly, also with embodiment an electrical insulation of the two electrodes, i.e. 4 and 7, 8 in respect of the metallic outer casing 1 is provided.

It must be pointed out here that characteristics or combinations of characteristics provided for one of the exemplified embodiments may analogously also be provided with the other exemplified embodiments.

The insulating material disk 9 provided between the two spacers 2 and 2" may be a separate individual part (see drawing). However, it may also form an integral part of the outer spacer 6.

The spacers 2 and 2" may advantageously consist of an electrically conductive plastic. To be able to select the field strength between the various spacers 2, 2", it is advantageous to let the thickness D of the insulating disk 9 increase towards the edge. The maximum of the field strength then always occurs along the sliding section 13. These measures moreover prevent a possible drop in the response voltage after loading. The embodiment according to FIG. 1*a* has the further advantage that in the case of a spark-over the burn-off of the material of the two spacers 2, 2" takes place uniformly, which results in a lengthening of the spark-over sliding section positioned between the inside surfaces of the spacers 2, 2" along the inside surface of the insulating material disk 9, and accordingly in an increase in the response voltage which counteracts the aforementioned drop. If required, the spacer 2" illustrated on the right in the drawing may also fall away.

Whereas the arc chamber sections L or L'+L" respectively, consist of a non-metallic, conductive and preferably gas-emitting plastic, the electrode 7, 8 is made of a metallic material which forms a nozzle duct 17 with an opening to the outside. In the area of the relatively cold, metallic nozzle walls a cooling of the hot gases takes place before they escape to the outside. With the invention furthermore smooth, homogeneous inside walls of the entire arc arrangement may be provided. The arc chamber section D, on the other hand, consists of the insulating material of the disk 9.

Figure 2:
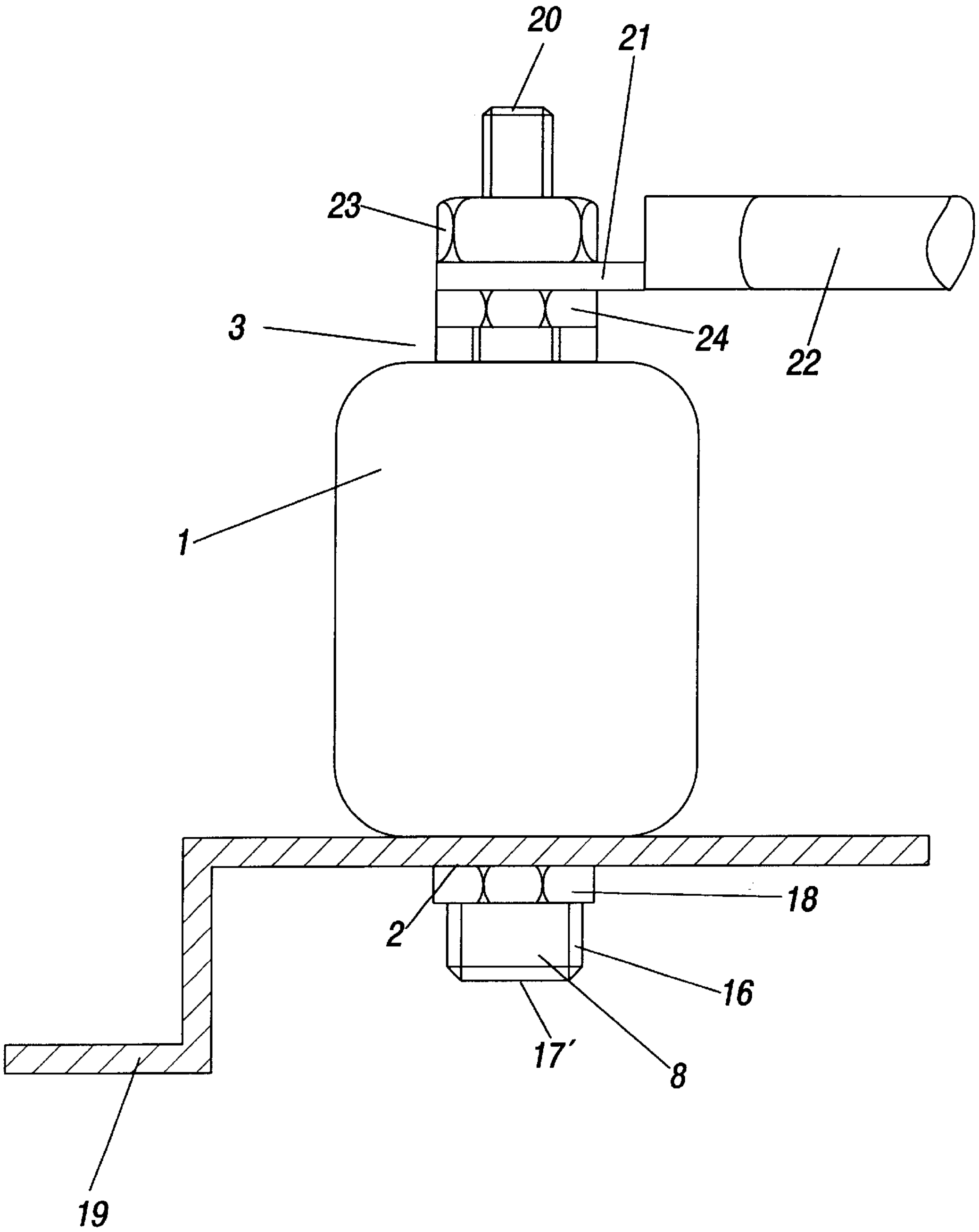
FIG. 2: shows essentially in a side view such a spark gap with connection means, which in this example are connected to a mounting plate and a connecting cable.

FIG. 2 shows the spark gap of FIG. 1 in a side view, wherein the connection piece-like electrode part 8 with its external thread 16 serves to screw the spark gap onto a metallic mounting plate 19. The outlet of the blow-off nozzle 17 is marked 17' and a counter-nut to hold the mounting plate 19 is marked 18.

The connection which in FIG. 2 is provided in the upper part of the spark gap consists of a screw connection 20 which is screwed into the internal thread 15 of the electrode 4. A cable shoe 21 of a connecting cable 22 can be screwed onto this screw connection 20 by means of a nut 23. Also here a counter-nut 24 is provided. The projecting part of the cover element 3 forms the insulation of the electrical connection in respect of the metal casing 1.

From the foregoing it results that a spark gap according to FIG. 1, 1*a* permits the explained selection possibilities of the spark-over voltage, of the follow-up current extinguishing capacity and of the surge current carrying capacity, and can also be screwed onto the most varying electrical connection points, i.e. insofar can to a large extent be used universally. This is very cost effective.

FIG. 3. shows the spark gap arrangement 1 according to FIG. 1 or 1*a* with a metal casing. It is arranged inside an external equipment housing 25 made of an insulating material. A connection 26 of this housing is connected to the electrode 4 by way of a connecting bracket 27 and a screw 28 which is screwed into the internal thread 15 of the electrode 4. Another connection 29 of the external housing 25 is connected by way of another connecting bracket 30 to the connection piece-like outlet of the electrode part 8. To this end the connecting bracket 30 is provided with a bore, with which it is placed over the outwards projecting connection piece of the electrode part 8, and it is held in position by a nut 31 which is screwed onto the external thread 16. At the gas outlet 17 an exhaust element 32 is provided. This exhaust element has the advantage that the "protective space" or a specific distance from blank, voltage carrying or combustible parts required for other blow-out spark gaps, is not needed or can be considerably reduced. This exhaust element is constructed in such a way that the flow velocity and accordingly the mass throughput of the out-flowing gases is reduced. This has a positive effect on the extinguishing capacity, in particular on the current limitation.

Seeing that the metal casing of the spark gap 1 may be alive, it is necessary in this case to provide it with a cap 33 of an insulating material. With this it is possible to keep the distance 9 to the connecting bracket 27 relatively small without the risk of a spark-over. The external equipment housing 25 with its connections 26, 29 serves, therefore, as an installation housing for this spark gap arrangement, the standardised outline of which fits into this housing. No special mechanical stresses are transmitted here from the spark gap to the external housing. Furthermore the external equipment housing must have a low creep current tendency. The module formed by the spark gap may not transmit any pressure generation due to hot gases or the like to the external equipment housing 25, especially by way of its metallic casing. The external equipment housing may be mounted or fastened in a detachable manner on installation carriers, e.g. busbars.

Figure 4A:
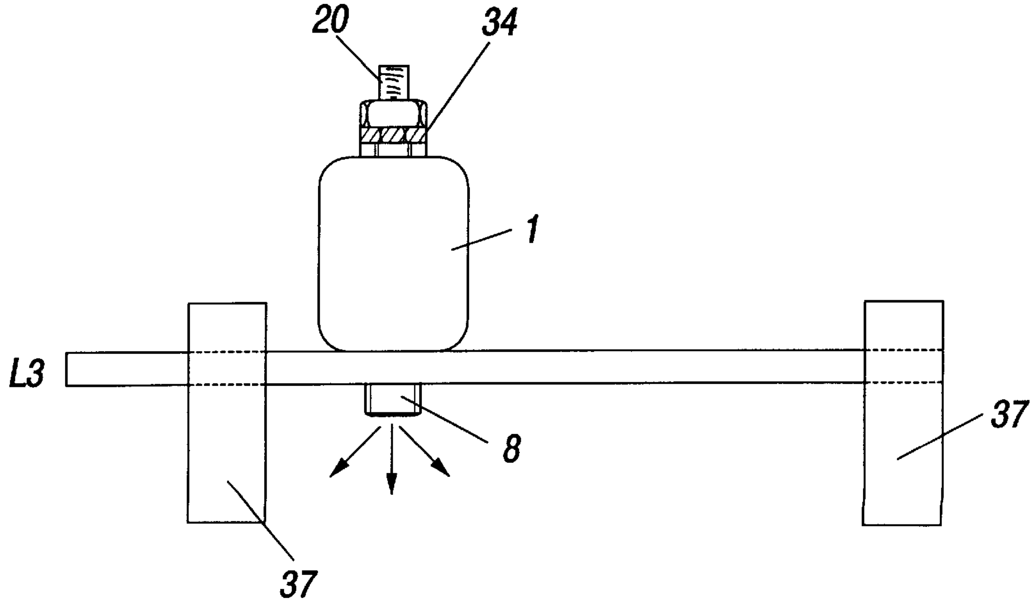
FIG. 4*a*: shows a side view of FIG. 1 in the direction of arrow IV*a,*

In FIGS. 4, 4*a* and 5, corresponding advantageous connections of such a spark gap to a multiple-pole busbar arrangement as well to a potential compensating bar are shown. Additional connection and installation elements required otherwise fall away here.

The exemplified embodiment of FIG. 4 and 4*a* shows a 3-phase system L1, L2 and L3 with a PE/PEN conductor. Three spark gaps 1 are provided, which on the outlet side are screwed with the projecting electrode part 8 to the busbars of the three abovementioned phases (in this connection see the side view 4*a*). At the top the electrodes 4 of the spark gaps are short-circuited via a busbar 34 and connected to the PE/PEN conductor. The busbar 34 can be held in position on the electrode with the aid of a screw connection piece 20 (in this connection see the description given with reference to FIG. 2). FIG. 4 furthermore shows diagrammatically a cable inlet 35 and cable outlets 36, as well as electrically insulating busbar holders 37. Such busbar systems are often used in switch and distribution systems of building installations. They are to be fitted in the illustrated and described manner with spark gaps which create a lightning current protected installation, including the explained advantages.

In the exemplified embodiment of FIG. 5 spark gaps 1 according to the invention are provided for connecting the cables 39 coming from the energy supply company in question or their busbar connection terminals to a potential compensating bar 38. The spark gaps 1 are, therefore, positioned between the respective busbar 40 and the potential compensating bar 38, so that in the case of over-voltages these are diverted directly to the potential compensating bar.

To this potential compensating bar 38 can be connected, in addition to the foundation earthing devices 41, for example a lightning conductor also marked 41, metal pipes 42 of a heating installation, a main potential compensating conductor 43 and the like. The potential compensating bar 38 accordingly provides a common earthing point of the spark gaps 1 in their function as over-voltage arresters and of all other systems to be included in the potential compensation.

In particular the last explained exemplified embodiments of FIG. 4 and 5 have the advantage of the easy installation of such a spark gap module with screw connections which are formed by the two electrodes 4 and 7, 8 respectively. This contributes to the universal use of such a spark gap, wherein a lightning protected installation can be realised since by the structural design and the possible connection technique of the invention, so-called "tap lines" in the leakage branch can be avoided.

The interaction between the explained electrical properties of such a spark gap already constitutes a combination or synergy effect. When the connections of the electrodes 4 and 7, 8, respectively, are constructed as indicated in the foregoing, this synergy effect can be reinforced even considerably further.

We claim:

1. A spark gap for use in a power supply of medium voltage and low voltage networks, comprising a housing having an interior, two rotationally symmetric electrodes mounted in the interior of the housing, a hollow-cylindrical arc space being defined between the two electrodes for an arc forming in the event of a spark-over and a follow-on current thereof, the arc space having a longitudinal center axis, the two electrodes being arranged one behind the other in a direction of the longitudinal center axis and being arranged with a gap therebetween, a disk of an electrically insulating material extending perpendicularly of the longitudinal center axis being positioned in the gap between the electrodes for electrically separating the two electrodes from one another, the disk having an opening adapted to the hollow-cylindrical arc space for forming a spark-over place for the arc, the arc space comprising a rotationally symmetric arc chamber concentric to the longitudinal center axis for the follow-on current, the arc chamber being located between the two electrodes, wherein the arc chamber has an electrically active length, the electrically active length being differently selectable while maintaining external dimensions of the spark gap.

2. The spark gap according to claim 1, comprising means for variably selecting a field strength of the spark-over place, while maintaining the external dimensions of the spark gap.

3. The spark gap according to claim 1, comprising an arc chamber element of an electrically conductive plastic surrounding the arc chamber, wherein a length of the arc chamber element is selectable.

4. The spark gap according to claim 3, wherein the electrically active length of the arc chamber is selectable by a length change of an adjacent electrode.

5. The spark gap according to claim 3, wherein the arc chamber element surrounding the arc chamber is comprised of a plastic which gives of f an extinguishing gas when heated.

6. The spark gap according to claim 5, wherein the extinguishing gas is $H_2$.

7. The spark gap according to claim 3, wherein the arc chamber element is mounted as a spacer between the two electrodes, a gap being defined between the spacer and one of the electrodes for receiving the insulating material disk, and wherein a thickness of the gap is selectable.

8. The spark gap according to claim 7, wherein the arc chamber element is laminated with dielectric materials having different conductivities, wherein a ratio of the electrically active length and the thickness of the insulating disk is approximately 10:1.

9. The spark chamber according to claim 7, further comprising another spacer of an insulating material positioned between the arc chamber element and the housing of the spark gap.

10. The spark gap according to claim 9, wherein an abutment surface is defined between the arc chamber element and the another spacer, the abutment surface being stepped such that the arc chamber element rests with only a circular flange against the insulating material disk, wherein the flange also surrounds the insulating chamber.

11. The spark gap according to claim 3, wherein the arc chamber element is comprised of two spacers having respective electrically active lengths, wherein the insulating material disk is arranged in a middle between the two spacers.

12. The spark gap according to claim 11, wherein the insulating material disk has a thickness which increases outwardly in a radial direction.

13. The spark gap according to claim 12, wherein the thickness of the insulating material disk increases linearly.

14. The spark gap according to claim 11, comprising a plurality of units comprised of two spacers and an insulating material disk which are positioned next to one another.

15. The spark gap according to claim 1, wherein the housing is a metal casing for holding together the components of the spark gap.

16. The spark gap according to claim 1, wherein the electrodes are comprised of connections.

17. The spark gap according to claim 16, wherein the connections are screw threads.

18. The spark gap according to claim 1, wherein one of the electrodes is comprised of a blow-out nozzle.

19. The spark gap according to claim 18, wherein the pull-out nozzle has an opening, further comprising exhaust elements for slowing down ejected gases and for reducing a temperature of the ejected gases, wherein the exhaust elements are mounted outside the blow-out nozzle adjacent the opening thereof.

20. The spark gap according to claim 18, wherein at least one of an inside diameter of the blow-out nozzle and a diameter of the arc chamber is selectable in order to at least one of change the surge current carrying capacity and limit the follow-on current.

21. The spark gap according to claim 1, wherein a first of the electrodes has a blind hole with an internal thread accessible from outside, and a second of the electrodes extends outwardly of the housing of the spark gap forming a connection piece provided on an outer periphery thereof with a screw thread.

22. The spark gap according to claim 1, wherein all components of the spark gap are rotationally symmetric relative to the longitudinal center axis.

23. The spark gap according to claim 1, wherein the spark gap is a module mounted in an external housing.

24. The spark gap according to claim 23, further comprising a cap of an insulating material placed over a metal casing of the module, such that the cap is positioned between the casing and the external housing.

25. The spark gap according to claim 1, comprising a multiple-phase arrangement of busbars, wherein each spark gap is screwed with a screw connection to the busbar and another screw connection of each spark gap is screwed to a common short-circuiting or grounding bar.

26. The spark gap according to claim 1, comprising a grounded multiple-phase connection, wherein a spark gap is provided for each phase, wherein one of screw connections thereof is screwed to a busbar and another screw connection is connected to a potential compensating bar.

* * * * *